(12) United States Patent
Garner, IV et al.

(10) Patent No.: US 11,042,858 B1
(45) Date of Patent: Jun. 22, 2021

(54) ASSESSING VALIDITY OF MAIL ITEM

(71) Applicant: Wells Fargo Bank, N.A., San Francisco, CA (US)

(72) Inventors: Andrew J. Garner, IV, State Road, NC (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 367 days.

(21) Appl. No.: 15/389,715

(22) Filed: Dec. 23, 2016

(51) Int. Cl.
*G06Q 30/04* (2012.01)
*G06Q 20/14* (2012.01)
*G06Q 30/02* (2012.01)
*G06Q 10/10* (2012.01)
*G06Q 50/06* (2012.01)

(52) U.S. Cl.
CPC ......... *G06Q 20/145* (2013.01); *G06Q 10/107* (2013.01); *G06Q 30/0279* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 6,285,991 B1 * | 9/2001 | Powar | G06Q 20/04 705/40 |
| 6,408,257 B1 | 6/2002 | Harrington et al. | |
| 6,674,426 B1 | 1/2004 | McGee et al. | |
| 7,245,765 B2 | 7/2007 | Myers et al. | |
| 7,440,915 B1 * | 10/2008 | Ulrich | G06Q 20/04 705/30 |
| 8,195,659 B2 | 6/2012 | Hull et al. | |
| 8,373,618 B2 | 2/2013 | Friedrich et al. | |
| 8,521,626 B1 * | 8/2013 | Orttung | G06Q 20/04 705/33 |
| 8,584,931 B2 | 11/2013 | Kim | |
| 8,660,369 B2 | 2/2014 | Llano et al. | |
| 8,811,711 B2 | 8/2014 | Calman et al. | |
| 8,867,741 B2 | 10/2014 | McCorkindale et al. | |

(Continued)

FOREIGN PATENT DOCUMENTS

WO 2015/147747 A1 10/2015

OTHER PUBLICATIONS

Hull, J. et al., "Paper-Based Augmented Reality," 17th International Conference on Artificial Reality and Telexistence 2007, pp. 205-209 (Nov. 28-30, 2007) (Year: 2007).*

(Continued)

*Primary Examiner* — David P Sharvin
(74) *Attorney, Agent, or Firm* — Merchant & Gould P.C.

(57) ABSTRACT

The validity of a mail item containing a monetary solicitation is determined. An image is received of the mail item and the image is analyzed to identify a plurality of data fields within the mail item. The validity or invalidity of the data within each of the plurality of identified data fields is then established, and a user-interactive image overlay is generated for the image of the mail item that includes a validity indicator for each of the plurality of identified data fields. The validity indicator is representative of the validity or invalidity of the data within each of the identified plurality of data fields. The user-interactive image overlay is sent to a user device to display the image of the mail item.

18 Claims, 9 Drawing Sheets

(56) References Cited

U.S. PATENT DOCUMENTS

| | | | |
|---|---|---|---|
| 8,990,235 B2 | 3/2015 | King et al. | |
| 9,137,232 B2 | 9/2015 | Eschbach et al. | |
| 9,202,326 B2* | 12/2015 | Doi | G07F 19/20 |
| 9,218,526 B2 | 12/2015 | Vartanian et al. | |
| 9,342,533 B2 | 5/2016 | Copsey | |
| 2002/0010784 A1* | 1/2002 | Clayton | G06F 21/6245 |
| | | | 709/229 |
| 2007/0006043 A1* | 1/2007 | Pins | G06F 11/3692 |
| | | | 714/38.14 |
| 2011/0218980 A1* | 9/2011 | Assadi | G06F 16/00 |
| | | | 707/700 |
| 2011/0293185 A1 | 12/2011 | Silverbrook et al. | |
| 2013/0241952 A1 | 9/2013 | Richman et al. | |
| 2014/0118560 A1 | 5/2014 | Bala et al. | |
| 2014/0164891 A1 | 6/2014 | Fan et al. | |
| 2014/0285684 A1 | 9/2014 | Huang | |
| 2014/0365875 A1 | 12/2014 | De Assuncao et al. | |
| 2015/0134555 A1* | 5/2015 | Fancher | G06Q 10/1053 |
| | | | 705/321 |
| 2015/0138385 A1 | 5/2015 | Kim | |
| 2015/0172603 A1 | 6/2015 | Gorodetski et al. | |
| 2015/0205777 A1 | 7/2015 | Campanelli et al. | |
| 2015/0254902 A1 | 9/2015 | Macia et al. | |
| 2015/0356068 A1 | 12/2015 | Hill et al. | |
| 2016/0049010 A1 | 2/2016 | Hinski | |
| 2017/0103375 A1* | 4/2017 | Green | G06Q 20/042 |

OTHER PUBLICATIONS

Arai, T. et al., "PaperLInk: A Technique for Hyperlinking from Real Paper to Electronic Content," CHI'97 Proceedings of the ACM SIGCHI Conference on Human Factors in Computing Systems, pp. 327-334 (Mar. 22-27, 1997).

Erol, B. et al., "HOTPAPER: Mutlimedia Interaction with Paper using Mobile Phones," MM '08 Proceedings of the 16th ACM International Conference on Multimedia, pp. 399-408 (Oct. 26-31, 2008).

Hull, J. et al., "Paper-Based Augmented Reality," 17th International Conference on Artificial Reality and Telexistence 2007, pp. 205-209 (Nov. 28-30, 2007).

Parikh, T., "Using Mobile Phones for Secure, Distributed Document Processing in the Developing World," IEEE Pervasive Computing, vol. 4, No. 2, pp. 74-81 (Apr.-Jun. 2005).

Verrecchio, A., "Layar Creator sees an interactive future for print media via augmented reality (video)," https://www.engadget.com/2012/06/05/layar-creator-printed-media-augmented-reality/, 3 pages (Jun. 5, 2012).

* cited by examiner

FIG. 4

LOGO —408          400          Name    John Q Customer —402
                                Service  123 Anywhere St
                                Address  Baltimore, MD 21204 —404
          410                   Account # 0000000000 —406

① Summary                                    ③ Next Scheduled Reading          July 1, 2014
Billing Date:              June 4, 2014      ④ Electric Usage Profile
Previous Balance                $122.62
Payments Received

| Month/Year | Type of Reading | Days | kWh | Avg. Daily Use | Avg. Temp |
|---|---|---|---|---|---|
| Jun 14 | Actual | 33 | 565 | 17.1 | 67 |
| May 14 | Actual | 30 | 386 | 12.9 | 56 |
| Jun 13 | Actual | 34 | 611 | 18.0 | 67 |

May 14, 2014                  -$122.62
BGE Outstanding Balance         $0.00
Charges/Adjustments this Period              ⑤ Gas Usage Profile
BGE Electric                    82.71
BGE Gas Delivery Service        20.57
BGE Gas Commodity         412   10.40
Total Charges This Period       $113.68

| Month/Year | Type of Reading | Days | Therms | Avg. Daily Use | Avg. Temp |
|---|---|---|---|---|---|
| Jun 14 | Actual | 33 | 21 | 0.6 | 67 |
| May 14 | Actual | 30 | 62 | 2.1 | 56 |
| Jun 13 | Actual | 34 | 25 | 0.7 | 67 |

| Total Amount Due by Jun 27, 2014 | $113.68 |

② Important Information About Your Bill       Important Information About Your Bill

Bill Front Sample

406
Please detach here and return this portion with your payment.

| Account Number | 0000000000 |    412    Please Pay by June 27, 2014

| Amount Due | Amount Paid |
|---|---|
| $113.68 |  |

⑥ A late charge will be applied to payments received after Jun 27, 2014
Please make check payable to BGE and include account number.
Thank you!

402
John Q Customer ／ ＿404
123 Anywhere St
Baltimore, MD 21204
                        408 — Company Name
                              P.O. Box 123
                        414 — Philadelphia, PA 12345

Bill Front Sample
500, 400

ASSESSING VALIDITY OF MAIL ITEM

BACKGROUND

Consumers are bombarded with both postal and electronic mail. A large portion of the mail a consumer receives comprises physical or electronic documents that are easily identified as advertisements offering a product or service for sale; these types of documents typically do not solicit any type of payment from the consumer. However, consumers also receive numerous mail items that do solicit payment. Such items include valid bills from creditors soliciting payment for products or services rendered, or solicitations from valid charities requesting donations. Unfortunately, such items also include fraudulent documents which are made to appear as valid bills or donation requests to the unwary individual in the hopes that unwarranted monies will be returned to the fraudster. Recent trends show that the elderly and those of diminished mental capacity are particularly susceptible to mail fraud with some losing tens of thousands of dollars.

SUMMARY

A system and method of ascertaining the validity of physical and/or electronic mail items containing monetary solicitations is described herein.

One aspect of the present disclosure is directed to a non-transitory computer-readable medium storing data instructions which, when executed by a processor, cause the processor to receive an image of a mail item and analyze the image of the mail item to identify a plurality of data fields within the mail item. The processor is additionally caused to establish a validity of the data, an invalidity of the data, or a warning related to the data within each of the plurality of identified data fields, and to generate a user-interactive image overlay for the image of the mail item that includes a validity indicator for each of the plurality of identified data fields. The validity indicator is representative of the validity the data, the invalidity of the data, or the warning related to the data within each of the identified plurality of data fields. The processor is further caused to send the user-interactive image overlay to a user device displaying the image of the mail item.

Another aspect of the present disclosure is directed to a non-transitory computer-readable medium storing data instructions which, when executed by a processor, cause the processor to obtain an image of a mail item and send the image of the mail item for data field analysis, the analysis including identifying a plurality of data fields within the mail item. The processor is additionally caused to receive, and display over the image of the mail item, a user-interactive image overlay that includes: (a) a validity indicator that is representative of whether each of the plurality of identified data fields within the image of the mail contain valid or invalid data; and (b) an action recommendation to pay or not pay a monetary amount to a payee; the monetary amount and the payee each comprising one of the plurality of data fields within the mail item.

Still another aspect of the present disclosure is directed to a method comprising: (a) obtaining an image of a mail item soliciting a monetary payment to a payee; (b) analyzing the image of the mail item to establish one or more data fields that identify at least: a monetary amount requested, a name of the payee, and a remittance address of the payee; (c) determining a validity or invalidity of the monetary amount requested, the payee and the remittance address; and (d) generating an image overlay to display over the obtained image of the mail item, the image overlay including: (i) a validity indicator for each of the amount requested, the payee and the remittance address, the validity indicator representative of the determined validity or invalidity; (ii) an action recommendation to pay or not pay the requested amount; and (iii) a user-interactive action button enabling payment of the requested amount to the payee at the payee remittance address from the user's bank account.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

FIG. 4 is an exemplary image of a physical or electronic mail item usable with method and system of the present disclosure.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
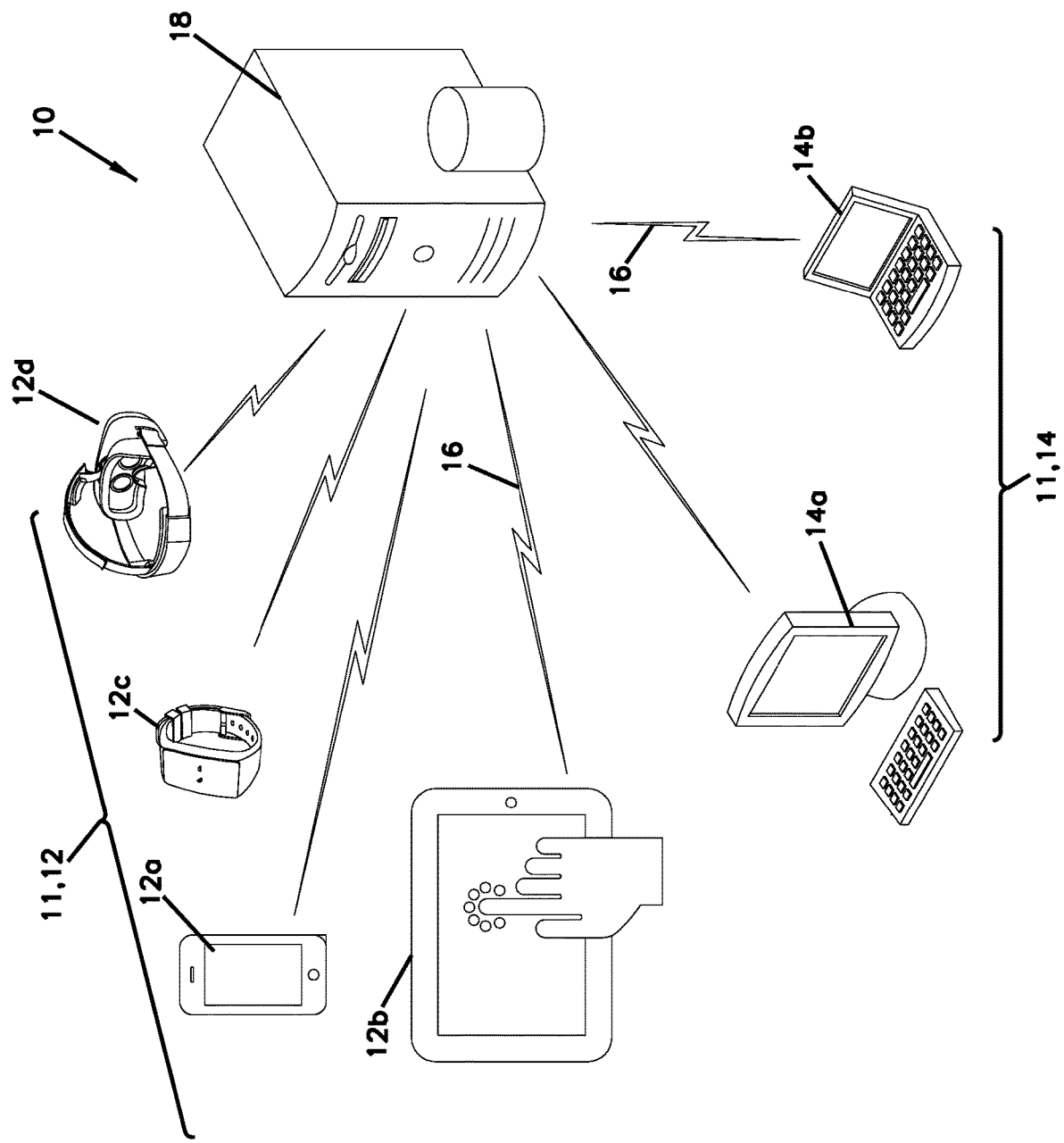
FIG. 1 is schematic of an exemplary system that can be used to implement a method of ascertaining the validity of physical and/or electronic mail containing monetary solicitations as described herein.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

A system and method for ascertaining the validity of physical and/or electronic mail items containing monetary solicitations is described herein. The system and method enable a user to obtain an image of the mail item and submit it for analysis. Analysis of the image of the mail item provides the user, in return, with an image overlay that is displayed over, or atop, the image of the mail item and includes one or more validity indicators indicating the valid or fraudulent nature of one or more portions of the mail item. In certain examples, the described system and method include an interactive user-interface wherein a user may select one of the validity indicators for: display of additional information; posing a verbal question; or typing a question related to the validity indicator. In the instance of a posed question, the described system and method can provide a visual or audio response. In certain examples, the system and method work in cooperation with a user's existing credentials that have been established with the user's banking services provider, e.g., bank, credit union, credit card company, etc., to enable payment requested by the mail item via the user's bank account.

Referring to FIG. 1, a schematic diagram of an exemplary system 10 for ascertaining the validity of physical and/or electronic mail items containing monetary solicitations. The system 10, in general of terms, includes one or more user devices 11 such as a smart device 12 (e.g., mobile phone 12a, tablet 12b, smart watch 12c, augmented reality glasses 12d, etc.) or a computer 14 (e.g., desktop computer 14a or laptop 14b) that can communicate via a wired or wireless network 16 to one or more host servers 18. In certain examples, the user devices 11 and/or the host servers 18 are communicatively coupled to banking services 20 with access to a user's bank account(s).

Figure 2:
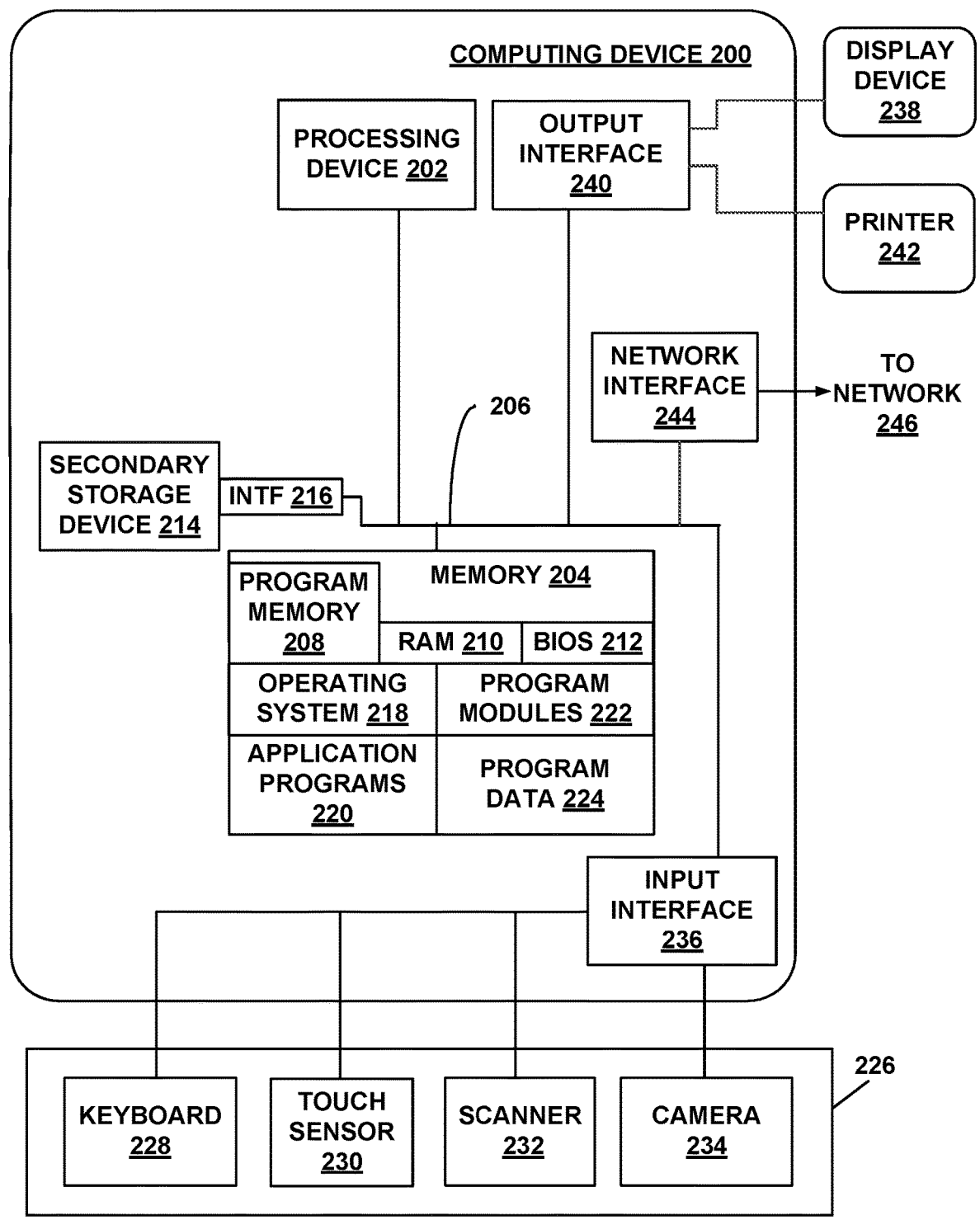
FIG. 2 is a schematic of an exemplary computing device that can be used to implement aspects of the present disclosure.

FIG. 2 illustrates an exemplary architecture of a computing device 200 that can be used to implement aspects of the present disclosure including the smart devices 12, computers 14 and host servers 18. The computing device 200 can be in any suitable form including a microcontroller, a microprocessor, a desktop computer, a laptop computer, a mobile computer device (e.g., smart phone, tablet, smart watch, or other mobile device), or other devices configured to process digital instructions. Accordingly to avoid undue repetition, this description of the computing device 200 will not be separately repeated herein for each smart device 12, computer 14 and host server 18. Rather, it is understood that the exemplary computing device 200 may be configured specific to its intended use incorporating various peripherals and programming instructions, as described herein, to achieve desired operations. Further, it is understood that the computing device 200 is an example of programmable electronics, which may include one or more such computing devices, and when multiple computing devices are included, such computing devices can be coupled together with a suitable data communication network so as to collectively perform the various functions, methods, and operations disclosed herein.

In general terms, the computing device 200 includes at least one processing device and at least one computer readable storage device. The processing device operates to execute data instructions stored in the computer readable storage device to perform various operations, methods or functions described herein.

In more particular terms, and with reference to FIG. 2, the computing device 200 includes at least one processing device 202 such as a central processing unit (BPU), as a well as a system memory 204 and a system bus 206. The system bus 206 couples various system components including the system memory 204 to the processing device 202. The system bus is one of any number of types of bus structures including a memory bus, a peripheral bus, and a local bus using any variety of bus architectures.

The system memory 204 includes program memory 208 and random access memory (RAM) 210. A basic input/output system (BIOS) 212 containing the basic routines that act to transfer information within the computing device 200, such as during start up, is typically stored in the program memory 208. In some embodiments, the computing device 200 also includes a secondary storage device 214, such as a hard disk drive or file server for storing digital data. The secondary storage device 214 is connected to the system bus 206 by a secondary storage interface (NTF) 216. The secondary storage device 214, and its associated computer readable media, provides nonvolatile storage of computer readable instructions (including application programs and program modules), data structures, and other data for the computing device 200.

Although the exemplary computing device 200 described herein employs a secondary storage device 214, in some embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disk memories, digital versatile disk memories and random access memories. Some embodiments of the second storage devices 214 include non-transitory media. Further, the computer readable storage media can include local storage or cloud-based storage.

A number of program modules can be stored in the memory, or the secondary storage device 214. These program modules include an operating system 218, one or more application programs 220, other program modules 222 as described herein, and program data 224. The computing device 200 can utilize any suitable operating system such as Microsoft Windows, Google Chrome, Apple OS, and any other operating system suitable for a computing device.

The computing device 200 typically includes at least some form of computer readable media, e.g., computer readable media within the memory 204 or secondary storage device 214. Computer readable media includes any available media that can be accessed by the computing device 200. By way of example, computer readable media includes computer readable storage media.

Computer readable storage media includes volatile and nonvolatile, removable and non-removable media implemented in any device configured to store information such as computer readable storage instructions, data structures, program modules or other data. Computer readable storage media includes, but is not limited to, random access memory, read only memory, electrically erasable programmable read only memory, flash memory, or other memory technology, compact disk read only memory, digital versatile disks or other optical storage, magnetic cassettes, magnetic tape, magnetic disk storage or other magnetic storage devices, or any other medium that can be used to store the desired information and that can be accessed by the computing device 200.

In some embodiments, a user provides inputs to the computing device 200 through one or more input devices 226. Examples of input devices include a keyboard 228, a touch sensor 230 (such as a touchpad or touch sensitive display), a scanner 232 and a camera 234. Other embodiments include other input devices 226 necessary for fulfilling the operations of the system 10, see FIG. 1. In some embodiments, the input devices are incorporated into the computing device 200 itself. In some embodiments, the input devices are external to the computing device 200 and are connected to the processing device 202 through an input interface 236 that is coupled to the system bus 206. The input devices can be connected by any number of input/output interfaces such as a parallel port, a serial port, a game port, a universal serial bus, or a custom interface. Wireless communication between input device and the input interface 236 is possible as well, and includes infrared, Bluetooth wireless technology, 802.11/a/b/g/n, cellular or other radio frequency communication systems in some possible embodiments.

In the example embodiment of FIG. 2, the computing device 200 incorporates within or is operably coupled to a display device 238. Examples of the display device 238 include a monitor, a liquid crystal display device, a projector, or a touch sensitive display device. The display device 238 is also connected to the system bus via an output interface 240, such as a display controller. In addition to the display device 238, the computing device 200 can control via output interface 240 various other peripherals such as a printing device 242 or speaker (not shown). As with the input interface 236, the output interface 240 can comprise any number of input/output interfaces such as those described in the paragraph above.

The computing device 200 further includes a network interface 244 that includes a network communication device to communicate digital data across a data communication network 246. An example of the network interface 244 includes a wireless transceiver for transmitting digital data over a wireless network. The wireless transceiver is configured to work with one or more wireless communication technologies such as cellular communication, Wi-Fi communication (such as that conforming to one of the IEEE802.11 family of communication protocols), Bluetooth communication, and the like. In other embodiments, the network interface 244 is an Ethernet network interface device having an Ethernet port for receiving an Ethernet cable to transmit and receive digital data across the Ethernet cable to a network 246 such as a local area network of the Internet.

Figure 3:
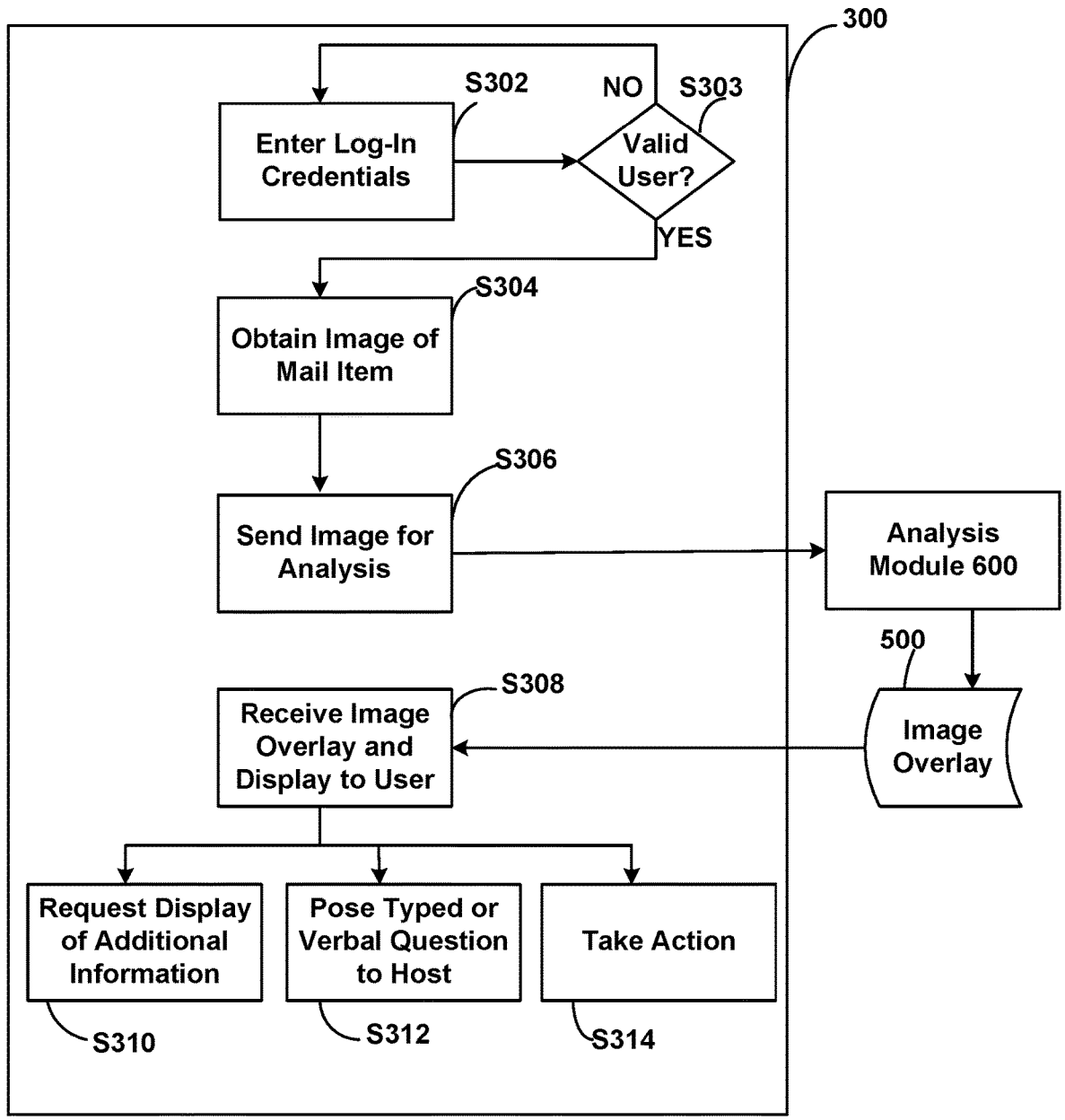
FIG. 3 is a flowchart illustrating an exemplary operation of a validity app according to the present disclosure.

When configured for operation as the user device 11, the computing device 200 includes an application program 220 and/or various program modules 222 such as a "validity app" 300 to enable the operations illustrated in the flowchart of FIG. 3. As shown, upon launching the validity app 300 on the user device 11, the user is prompted to enter their credentials to establish themselves a valid user of the app, S302. Such user-entered credentials may include a user name and password, biometric credentials or other suitable forms of identifying the user. In certain examples, the validity app 300 is independently hosted. In other examples, the validity app 300 is hosted by the user's banking services provider. Accordingly, the credentials used to establish the user as a valid user of the banking services can also be used to establish them as a valid user of the validity app 300. In still other examples, the validity app 300 is hosted by a different type of service provider to the user and the user may use the credentials established with that service provider to log-in or establish themselves as a valid user of the validity app.

Upon activating the validity app 300 and establishing themselves as a valid user [YES; S303], the user utilizes the user device 11 to obtain an image of a physical and/or electronic mail item containing a monetary solicitation that the user wishes to be validated, S304. The image of the mail item can be obtained through any convenient means. For example, the image of the mail item can be obtained: by using the camera 234 of the user device 11; by scanning the mail item with a peripheral scanner; by retrieving an image from memory in the user device 11; by taking a screen shot of the display of the user device 11; etc. In certain examples, the image of the mail item is in a common image format, e.g., PDF, TIFF, GIF, JPEG, FPX, PCD, PNG, etc. while in other examples the image of the mail item is in a proprietary image format that can be exclusive to the host of the validity app 300.

An example of an image of a mail item 400 containing a monetary solicitation is illustrated in FIG. 4. As shown, the exemplary mail item 400 includes various fields including: (a) user/payor name 402; (b) user/payor address 404; (c) user/payor account number 406; (d) payee name and/or payee logo 408; (d) charges to the account 410; (e) amount owed by the user/payor 412; and (f) physical or electronic address for remittance of payment 414. Other fields not shown can also be included in the mail item, for example, a web address for the user/payor to review their bill, one or more fields to enter additional personal information such as a social security number or telephone number, "fine print" language fields that include terms, limitations and/or commitments that may be binding on the user, etc.

Figure 5A:
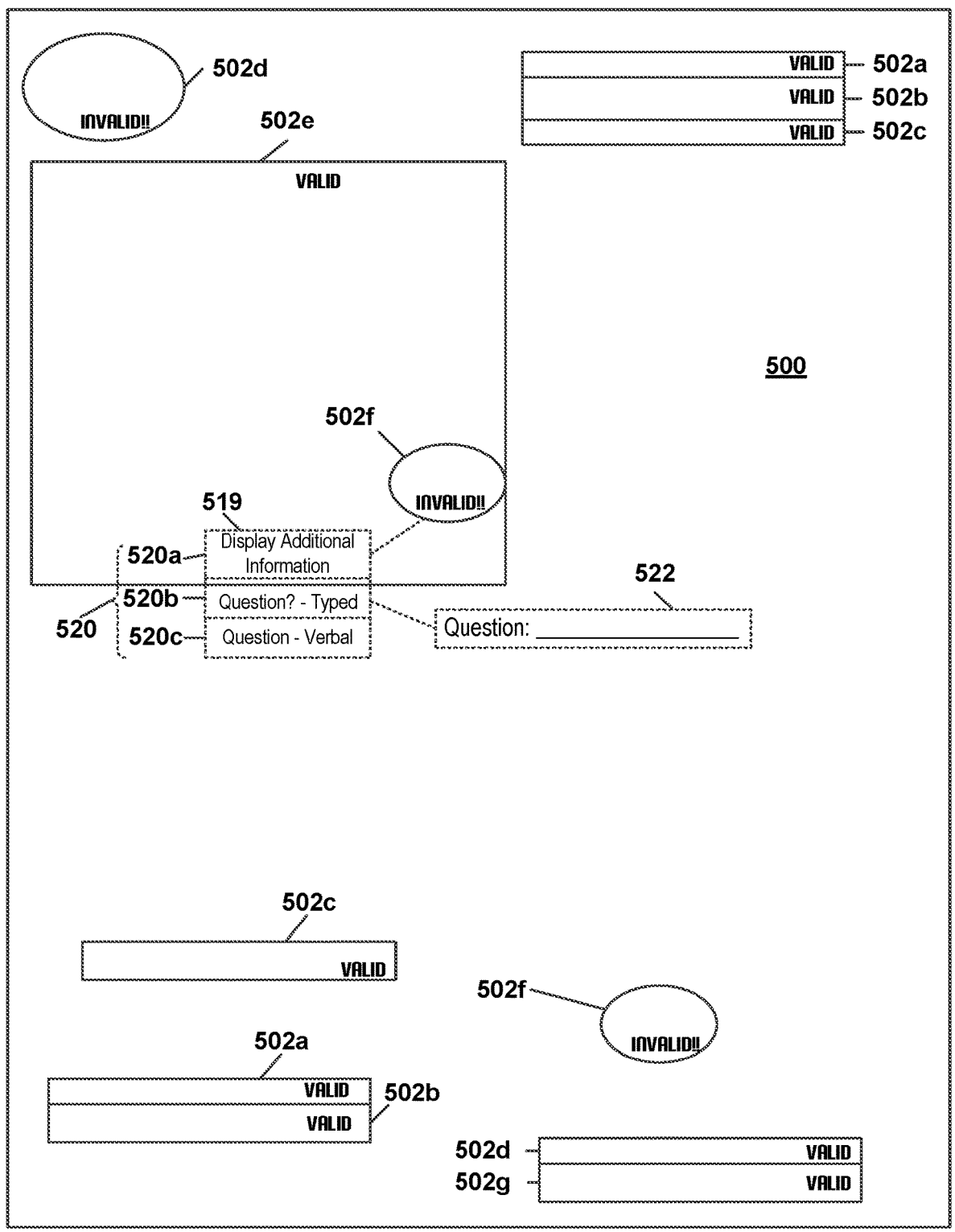
FIG. 5A is an exemplary image overlay according to the present disclosure.

Referring once again to the system of FIG. 1 and the flowchart of FIG. 3, upon obtaining an image of the mail item, the image is sent by the user from the user device 11 over the wired or wireless network 16 to an analysis module 600 at the host server 18, S306, wherein the image will be analyzed and an image overlay will be produced as described in further detail below. Upon analysis, the image overlay is returned from the host server 18 to the user device 11, and displayed atop the image of the mail item, S308. An example of an image overlay 500 is illustrated in FIG. 5A and described in further detail below. The image overlay 500 provides an interactive user interface on the user device 11 from which the user may request the display of additional information from the application host, S310, pose a typed or verbal question to the application host, S312, and/or initiate a desired action, S314.

Figure 6:
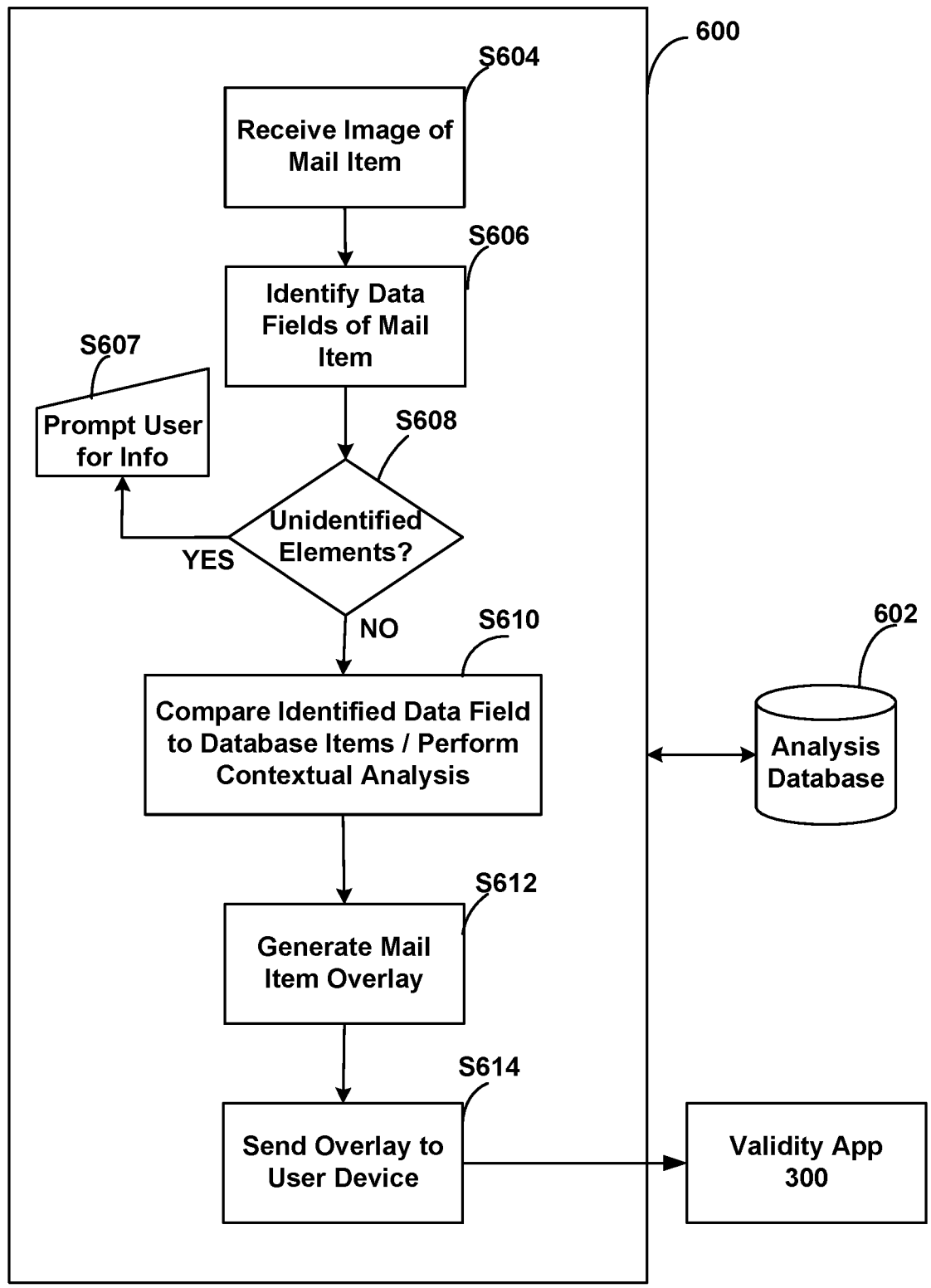
FIG. 6 is a flowchart illustrating an exemplary operation of an analysis module of the present disclosure.
Figure 7:
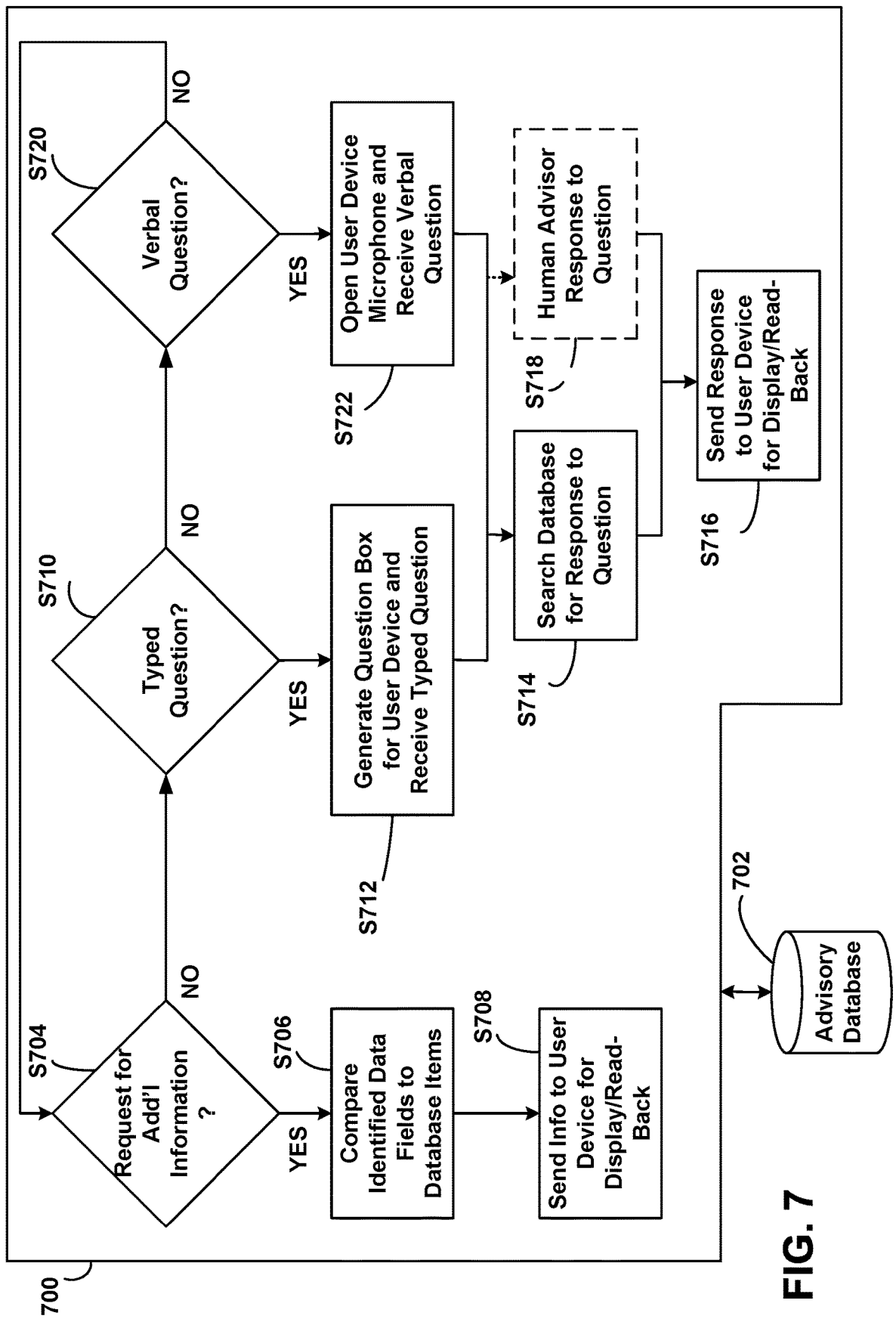
FIG. 7 is a flowchart illustrating an exemplary operation of an advisory module of the present disclosure.

When configured for operation as the host server 18, the computing device 200 includes an application program 220 and/or various program modules 222 such as the analysis module 600 to enable the operations illustrated in the flowchart of FIG. 6 and an advisory module 700 to enable the operations illustrated in the flowchart of FIG. 7.

Referring to FIG. 6, the analysis module 600 of the host server 18 operates in conjunction with an analysis database 602 to receive the image of the mail item (e.g., mail item 400), S604 and to diagram the image of the mail item to identify the data fields of the image, S606. The identified data fields of the image of the mail item generally correspond to the fields with respect to the exemplary image of the mail item 400. For example, the identified data fields of the image of the mail item can include: (a) user/payor name 402; (b) user/payor address 404; (c) user/payor account number 406; (d) payee name and/or payee logo 408; (d) charges to the account 410; (e) amount owed by the user/payor 412; and (f) physical and/or electronic address for remittance of payment 414. Other elements of the image can, of course, be identified relative to the specific configuration of the mail item, e.g., a web address for the user/payor to review their bill, one or more fields to enter additional personal information such as a social security number or telephone number, "fine print" language fields that include terms, limitations and/or commitments that may be binding on the user, etc. The identified data fields can remain in image format or can be extracted into a text format or an audio playback format. In certain examples, the analysis module 600 may be unable to identify all data fields of the mail item and can message the user at the user device 11 to enter additional information, S607, about the unidentified data field or ignore the unidentified data field, S608.

With all possible data fields of the image of the mail item identified, the analysis module 600 enables comparison of the identified data fields against similar reference elements, S610 that have previously been identified and stored within the analysis database 602. The reference elements, in text, image or audio format, can be elements that were obtained from: previous mail item images obtained from the user, previous mail item images that were obtained from users different from the current user, legitimate billing formats obtained directly from the payee or third party organizations, lists of known fraudulent payees or addresses associated with fraudulent payees, lists or data patterns of common fraudulent characteristics of text or image, etc. In certain examples, the comparison can also include a comparison of redundant identified elements from the image of the mail item for consistency. In addition to the comparison, or in lieu of the comparison, the analysis module 600 can perform a contextual analysis of the mail item to discern the various fields noted above as well as, for example, the use of unusual grammar, misspellings, odd fonts, odd formats, etc. via image analysis, text analysis or audio analysis of the mail item. In certain examples, the contextual analysis is performed using, for example, artificial intelligence, deep learning, cognitive computing and/or other advanced computer-based analysis techniques.

Based on the comparison, the analysis module 600 enables the generation of the image overlay, e.g., image overlay 500, which includes indicators to indicate the validity of the data fields and/or of the overall mail item, S612 and the generated image overlay 500 is sent to the user device 11, S614, for display thereon.

Figure 5B:
FIG. 5B is the exemplary image overlay of FIG. 5A atop the image of the mail item of FIG. 4.

Referring once again to FIG. 5A, an exemplary image overlay 500 is illustrated. As noted above, the image overlay 500 provides an interactive user interface on the user device 11 from which the user may request the display of additional information and/or pose a typed or verbal question; the image overlay includes at least one validity indicator 502 indicating the validity or lack of validity of the mail item 400. In the present example the image overlay 500 includes a plurality of validity indicators 502 including, but not limited to: a) user/payor name 502*a*; (b) user/payor address 502*b*; (c) user/payor account number 502*c*; (d) payee name and/or payee logo 502*d*; (e) charges to the account 502*e*; (f) amount owed by the user/payor 502*f*; and (g) address for remittance of payment 502*g*. Each of the validity indicators 502 may be in the form of one or more of: a text indicator (e.g., "VALID," "INVALID", "WARNING," etc.), a color indicator (e.g., green=valid, red=invalid, yellow=warning), an outline indicator (e.g., a first shape (rectangle)=valid, a second shape (oval)=invalid, a third shape (triangle)=warning; or line thickness/type—thin line=valid, bold line=invalid, dashed line=warning), or an audio indicator. In certain examples, there are at least two validity indicators statuses, e.g. VALID and INVALID. In certain examples, there are at least three validity indicator statuses, e.g., VALID, INVALID, WARNING. The WARNING indicator can be used as an initial indicator for various purposes. For example, the WARNING indicator can be the initial indicator notifying/advising the user of the presence terms or conditions that may adversely affect the user such as charges to the user account, excess fees, consenting to automatic withdrawals, etc. The WARNING indicator can also be the initial indicator for account health status warnings, e.g. the user account does not contain sufficient funds to pay the requested amount, etc. Selection of the WARNING indicator can provide the user with additional information related to the warning, see description below related to the interactive features of the image overlay 500. Additional indicator statuses may be used as appropriate to the mail item image under analysis. In the example of FIG. 5A, both text and shape are used to indicate VALID status (e.g. rectangle and word "VALID") and to indicate an INVALID status (e.g., oval and word "INVALID"). FIG. 5B illustrates the image overlay 500 in place atop the image of the mail item 400.

Figure 5C:
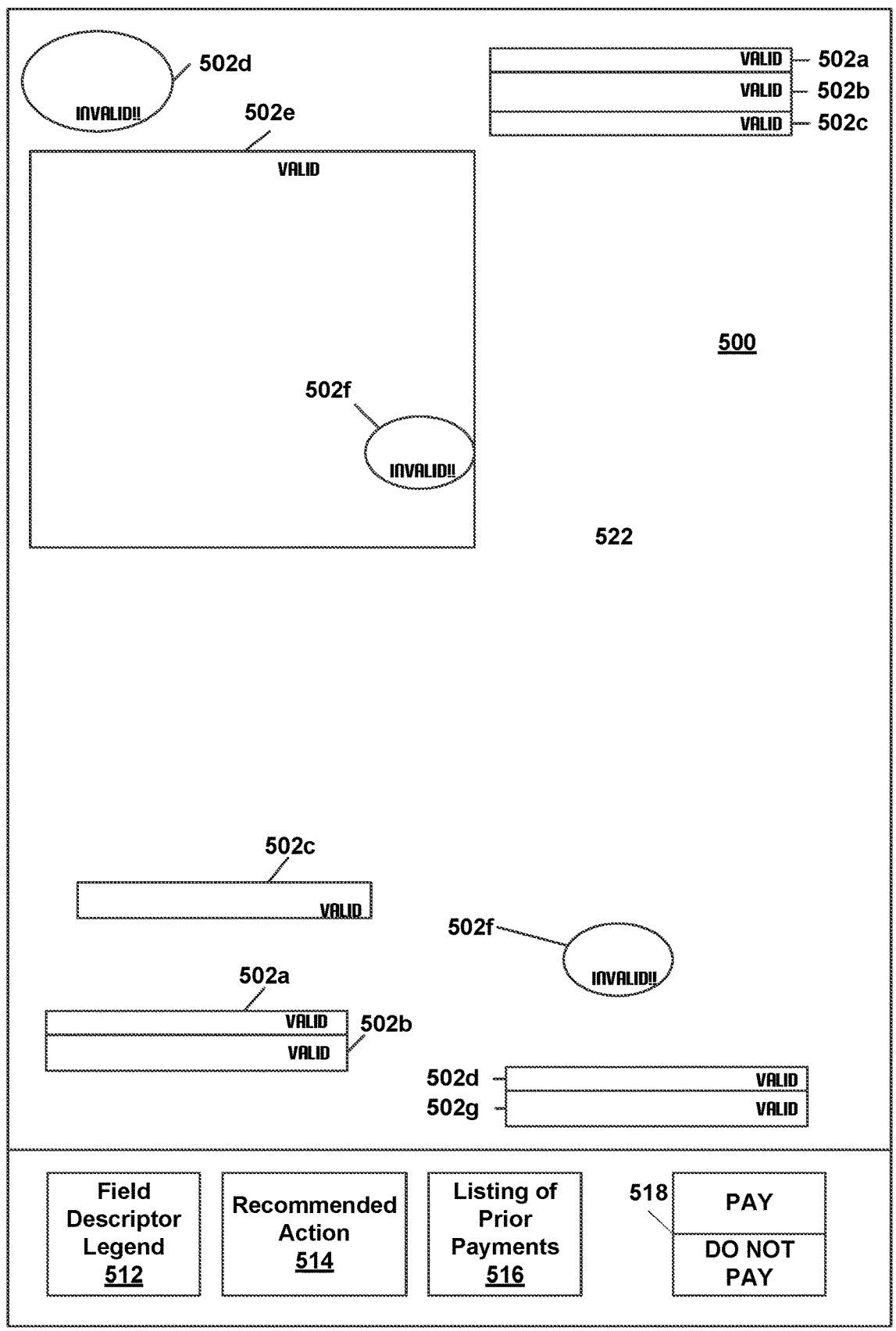
FIG. 5C is another exemplary image overlay according to the present disclosure.

In certain examples, the image overlay 500 provides additional information beyond that described above with reference to FIGS. 5A and 5B. In FIG. 5C, an example of an image overlay 500 is provided with an information bar 510. In this example the information bar 510 is located at the bottom of the image overlay 500 be can included anywhere within the confines of the image overlay 500. The information bar 510 can include additional information such as a legend of field descriptors 512 (e.g., "name", "address", "name of payee", etc.), an action recommendation 514 (e.g., "pay" or "do not pay"), a listing of prior/historical user payments or actions made relative to the payee 516 by the payor/user, and/or an action button 518 providing the options of "PAY" or "DO NOT PAY". In the instance that the validity app 300 is hosted by the user's banking services provider and the user has established themselves as a valid user of the validity app 300, the action button 518 can be configured with access to the user's bank account. Such that a selection of "PAY" from the action button 518 results in remittance of the amount owed, e.g., amount 412, to the payee, e.g. payee 408, identified in the image of the mail item from the user's associated bank account. A selection of "DO NOT PAY" at the action button 518 results in non-payment. In certain examples, the action button 518 is customized by the analysis module 600 in a manner that is specific to the actions that the image of the mail item has requested as determined by the analysis module 600. For example, the action button 518 can include an option to pay a different amount, to pay an amount to a third party, to reject or accept a binding condition, etc.

As noted above with respect to the flowchart of FIG. 3, the image overlay 500 provides an interactive user interface on the user device 11 from which the user may request the display of additional information from the application host, S310, S312, S314. More specifically, each of the validity indicators 502 and/or items within the information bar 510 may be selected by the user. In certain examples, upon selection of one of the validity indicators 502 or item within the information bar 510, the user is presented with a pop-up menu 519 (see example in FIG. 5A) to select from at least one, and more preferably, two or more informational options 520, e.g., to display additional information 520*a*, to enter a typed question 520*b*, and/or to state a verbal question 520*c*; other and/or additional informational options may be provided.

Selection of one of the informational options 520 from the image overlay 500 invokes utilization of the advisory module 700 by the host server 18. The advisory module 700 operates in conjunction with an advisory database 702 to provide the information requested, see the flowchart of FIG. 7. In the instance of responding to the selection for display of additional information S704, the advisory module 700 enables the host server 18 to search the advisory database 702 for information related to the corresponding selected item (e.g. the validity indicator 502 or the item from the information bar 510), S706, and sends the information to user device 11 for display and/or read-back, S708. Such additional information found in the advisory database 702 may include, but is not limited to: the corresponding field name of the selection, historical information about the selection, fraud alerts related to the selection, and/or user warnings related to the selection. User warnings can include, for example, notifying/advising the user of the presence terms or conditions that may adversely affect the user such as charges to the user account, excess fees, consenting to automatic withdrawals, etc. User warnings can also include account health status warnings, e.g. the user account does not contain sufficient funds to pay the requested amount.

In the instance of responding to the selection for entering a typed question, S710, the advisory module 700 initiates the generation of a question box, see example question box 522 in FIG. 5A, for presentation to the user at the user device 11 and receives the user's typed question, S712. Upon the typed entry of the user's question, the advisory module 700 operates to search for an identical or similar question previously stored in the advisory database 702 and its corresponding response, S714; the corresponding response can then be sent, S716, to the user device 11 for display and/or verbal read-back by the user device 11. In certain examples, alternatively or in addition to searching based on the whole question, S714, the typed question is parsed by the advisory module 700 for keywords that may be searched within the advisory database 702 to obtain corresponding response(s), S716, for display and/or verbal read-back by the user device 11. In certain examples, alternatively or in addition to searching the advisory database 702, the advisory module 700 can operate to establish a connection with an individual (e.g. a human advisory support representative), S718, who can provide a typed and/or verbal response to the question for display and/or read-back at the user device 11. Further, alternatively or in addition to searching the advisory database 702, the advisory module 700 can use advanced computing techniques, for example, artificial intelligence, deep learning, cognitive computing, etc., to determine an appropriate response to any user questions.

In the instance of response to the selection for posing a verbal question, S720, the advisory module 700 initiates the opening of a microphone of the user device 11 and directs the host server 18 to receive the user's verbal question, S722. As with the typed question, the advisory module 700 operates to search for an identical or similar question previously stored in the advisory database 702 and its corresponding response. S714; the corresponding response can then be sent, S716, to the user device 11 for display and/or verbal read-back by the user device 11. In certain examples, alternatively or in addition to searching based on the whole question, S714, the typed question is parsed by the advisory module 700 for keywords that may be searched within the advisory database 702 to obtain corresponding response(s), S716, for display and/or verbal read-back by the user device 11. In certain examples, alternatively or in addition to searching the advisory database 702, the advisory module 700 can use advanced computing techniques, for example, artificial intelligence, deep learning, cognitive computing, etc., to determine an appropriate response to any user questions. In certain examples, alternatively or in addition to searching the advisory database 702, the advisory module can operates establish a connection with an individual (e.g. a human advisory support representative or a designated trusted party), S718, who can provide a typed and/or verbal response to the question for display and/or read-back at the user device 11. In certain examples, the user is notified at the user device 11 of the connection with the representative. Any combination of text and speech may be used to pose and/or respond to a user question. A user may continue to select various informational options 520 for the various validity indicators 502 and/or items within the information bar 510 as desired.

In certain examples, additional functionality is provided to the various systems and methods described above. For example, in addition to selecting various informational options 520 for the various validity indicators 502 and/or items within the information bar 510, the validity app 300 can allow the user to highlight and/or zoom in on an area on the image of the mail item for specific consideration by the analysis module 600 and/or advisory module 700. Further, the validity app 300 can provide the user with the functionality to move the image of the mail item and overlay onto another display device such as a connected television, smartphone, or augmented reality headset whereby the user may then utilize the user device 11 as the control mechanism for the display.

It should be noted that while the above-described system and method reference a mail item containing a monetary solicitation, the system and method can additionally or alternatively be applied to other types of documents such as legal documents, (e.g. purchase agreement, rental agreement, will, business contract) or financial statements (e.g., income statement, expense statement) in single page or multi-page form. The system and method of the present disclosure can essentially be applied to any document about which a user may wish to pose a question. As such the action button, e.g. action button 518, can be configured to initiate different types of actions based on the type of document. For example, the action button can be configured to enable an electronic signature.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A non-transitory computer-readable medium storing data instructions which, when executed by a processor, cause the processor to:
receive an image of a mail item captured by a camera of an augmented reality user device;
identify a plurality of data fields within the mail item, wherein identifying the plurality of data fields includes analyzing the image of the mail item;
establish a validity of the data, an invalidity of the data, or a warning related to the data within each of the plurality of data fields;
generate a user-interactive image overlay for the image of the mail item that includes a validity indicator associated with each of the plurality of identified data fields within the mail item, with each validity indicator being positioned on the user-interactive image overlay adjacent to each of the plurality of identified data fields, wherein the validity indicator is representative of the validity of the data, the invalidity of the data, or the warning related to the data within each of the identified plurality of data fields;
send the user-interactive image overlay to the augmented reality user device displaying the image of the mail item, whereby the augmented reality user device controls the display of the user-interactive image overlay of the mail item to create an augmented reality environment wherein each validity indicator is positioned adjacent to each of the plurality of identified data fields; and when the validity indicator associated with one of the plurality of identified data fields is selected, generate an option to: enter a typed question in a text box for additional information or state a verbal question through a microphone for additional information.

2. The non-transitory computer-readable medium of claim 1, wherein the processor is further caused to provide: a display response; a typed response; or a verbal response to the request for additional information.

3. The non-transitory computer-readable medium of claim 1, wherein the validity indicator represents the validity or the invalidity of the data within each of the identified plurality of data fields through: shape, color, text, and/or audio.

4. The non-transitory computer-readable medium of claim 1, wherein the user-interactive image overlay for the image of the mail item includes an action recommendation to pay or not pay a monetary amount to a payee, wherein the monetary amount and the payee each comprise one of the plurality of data fields within the mail item.

5. The non-transitory computer-readable medium of claim 1, wherein the user-interactive image overlay for the image of the mail item includes an interactive option to select the rejection or acceptance of a binding condition, wherein the binding condition comprises one of the plurality of data fields within the mail item.

6. The non-transitory computer-readable medium of claim 4, wherein the user-interactive image overlay for the image of the mail item includes a user-interactive action button to select an option to pay or not pay the monetary amount to the payee.

7. The non-transitory computer-readable medium of claim 6, wherein the user-interactive image overlay for the image of the mail item includes a listing of historical user payments or actions relative to the payee.

8. The non-transitory computer-readable medium of claim 1, wherein the data instructions further cause the processor to establish a validity or invalidity of the data within each of the plurality of data fields through comparison of the data against established reference elements.

9. The non-transitory computer-readable medium of claim 8, wherein the reference elements are in image format.

10. The non-transitory computer-readable medium of claim 8, wherein the reference elements comprise data obtained from previous mail item images obtained from a current user.

11. The non-transitory computer-readable medium of claim 10, wherein the reference elements additionally comprise data obtained from previous mail item images obtained from a previous user different from the current user.

12. The non-transitory computer-readable medium of claim 11, wherein the reference elements additionally comprise legitimate billing formats obtained directly from a payee, wherein the payee comprises one of the plurality of data fields within the mail item, or from a third party organization.

13. The non-transitory computer-readable medium of claim 12, wherein the reference elements additionally comprise a list of known fraudulent payees or addresses associated with fraudulent payees.

14. The non-transitory computer-readable medium of claim 13, wherein the reference elements additionally comprise a list or data pattern of common fraudulent characteristics.

15. The non-transitory computer-readable medium of claim 1, wherein the data instructions further cause the processor to establish a validity or invalidity of the data within each of the plurality of data fields through comparison of redundant identified data fields.

16. A non-transitory computer-readable medium storing data instructions which, when executed by a processor, cause the processor to:
obtain an image of a mail item captured by a camera of an augmented reality user device;
send the image of the mail item for analysis, the analysis including identifying a plurality of data fields within the mail item; and
receive at the augmented reality user device and display, over the image of the mail item, a user-interactive image overlay, whereby the augmented reality user device controls the display of the user-interactive image overlay to create an augmented reality environment that includes:
a validity indicator positioned on the user-interactive image overlay adjacent to each of the plurality of identified data fields, wherein each validity indicator is representative of whether each of the plurality of identified data fields within the image of the mail item contain valid or invalid data; and
when the validity indicator associated with one of the plurality of identified data fields is selected, an option to: enter a typed question in a text box for additional information or state a verbal question through a microphone for additional information; and
an action recommendation to pay or not pay a monetary amount to a payee, wherein the monetary amount and the payee each comprise one of the plurality of data fields within the mail item.

17. The non-transitory computer-readable medium of claim 16, wherein the user-interactive image overlay for the image of the mail item includes a user-interactive action button to select an option to pay or not pay the monetary amount to the payee.

18. A method comprising:
obtaining an image, captured by a camera of an augmented reality user device, of a mail item soliciting a monetary payment to a payee;
analyzing the image of the mail item to establish one or more data fields that identify at least: a monetary amount requested, a name of the payee, and a remittance address of the payee;
determining a validity or invalidity of the monetary amount requested, the payee and the remittance address; and
generating an image overlay to display over the obtained image of the mail item, the image overlay including:
a validity indicator for each of the amount requested, the payee and the remittance address, with each validity indicator being representative of the determined validity or invalidity and positioned on the image overlay adjacent to each of the amount requested, the payee and the remittance address;
an action recommendation to pay or not pay the requested amount; and a user-interactive action button enabling payment of the requested amount to the payee at the payee remittance address from the user's bank account;

sending the image overlay to the augmented reality user device displaying the image of the mail item, whereby the augmented reality user device controls the display of the image overlay of the mail item to create an augmented reality environment wherein each validity indicator is positioned adjacent to each of the one or more data fields; and when the validity indicator associated with one of the one or more data fields is selected, generate an option to: enter a typed question in a text box for additional information or state a verbal question through a microphone for additional information.

* * * * *